(12) United States Patent
Kashio et al.

(10) Patent No.: US 6,200,703 B1
(45) Date of Patent: *Mar. 13, 2001

(54) BINDER SOLUTION AND ELECTRODE-FORMING COMPOSITION FOR NON-AQUEOUS-TYPE BATTERY

(75) Inventors: Hidetora Kashio; Katsuo Horie; Takumi Katsurao; Fumio Shibata; Aisaku Nagai, all of Iwaki (JP)

(73) Assignee: Kureha Kagaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/779,955

(22) Filed: Dec. 23, 1996

(30) Foreign Application Priority Data

Dec. 26, 1995 (JP) .................................................. 7-350782
May 17, 1996 (JP) .................................................. 8-146473

(51) Int. Cl.⁷ .................................................. H01M 4/62
(52) U.S. Cl. .................................................. 429/217
(58) Field of Search .................................. 429/194, 217

(56) References Cited

FOREIGN PATENT DOCUMENTS 0601754   6/1994   (EP) .
2-68855   3/1990   (JP) .
WO 90/09232   8/1990   (WO) .

OTHER PUBLICATIONS

Malmonge et al., "Electroactive blends of poly(vinylidene fluoride) . . . Polymer", vol. 36, issue 2, p. 245–249, Jan. 1995.*

Patent Abstracts of Japan vol. 008, No. 107 (E–245), May 19, 1984 & JP 59 023461 A (Shinkoube Denki KK), Feb. 6, 1984, abstract.

Database WPI Section Ch, Week 9520 Derwent Publications Ltd., London, GB; Class L03, AN 95–150167 XP002029198 & JP 07 073 882A (Haibaru YG), Mar. 17, 1995; abstract.

* cited by examiner

Primary Examiner—Carol Chaney
(74) Attorney, Agent, or Firm—Wenderoth, Lind & Ponack, L.L.P.

(57) ABSTRACT

A vinylidene fluoride polymer binder solution for forming an electrode for a non-aqueous-type battery is formed by adding an acid, preferably an organic acid, as a stabilizer to a solution of a vinylidene fluoride polymer in an organic solvent. The acid is preferably added in an amount sufficient to ensure a pH of at most 9 when measured with respect to a 10-times dilution of the binder solution with deionized water. The acid addition is effective for preventing a problematic viscosity increase in the binder solution and also gelling of an electrode-forming composition formed by adding a powdery electrode material in the binder solution.

9 Claims, 1 Drawing Sheet

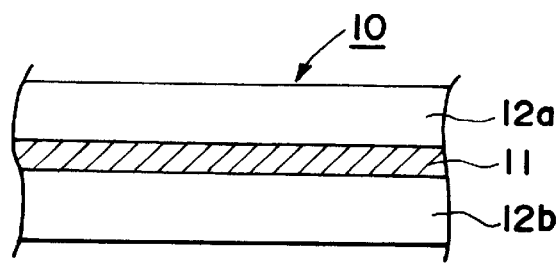
F I G. 1
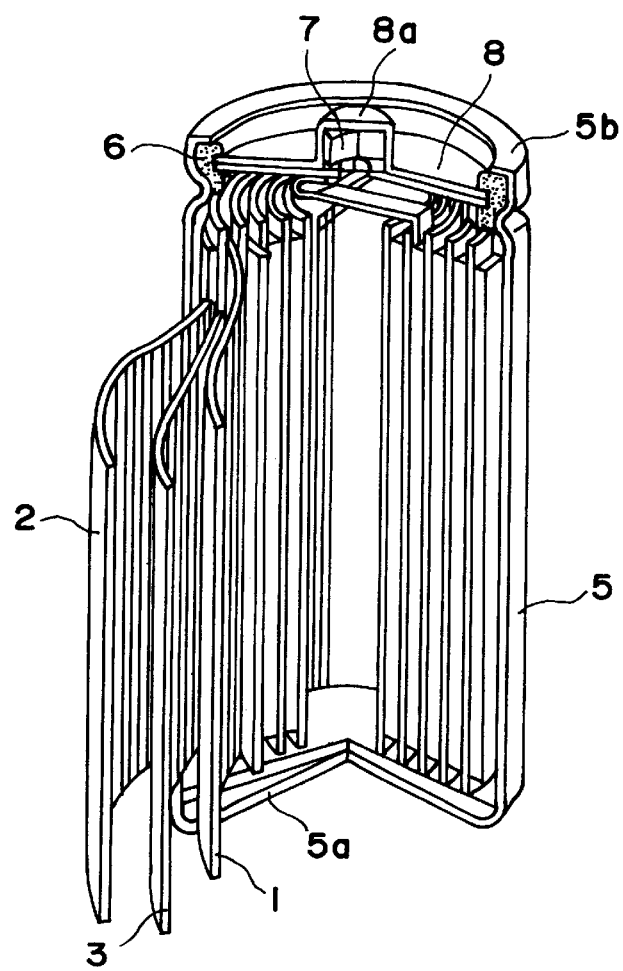
F I G. 2

BINDER SOLUTION AND ELECTRODE-FORMING COMPOSITION FOR NON-AQUEOUS-TYPE BATTERY

FIELD OF THE INVENTION AND RELATED ART

The present invention relates to a solution of a binder comprising a vinylidene fluoride polymer (i.e., a vinylidene fluoride polymer binder solution) for stably fixing a powdery electrode material (principally comprising an electrode active substance and an optionally added electroconductivity-imparting additive) onto an electrode substrate to form an electrode structure for a non-aqueous battery, particularly a lithium ion battery. The present invention further relates to an electrode-forming composition comprising a mixture of such a binder solution and a powdery electrode material dispersed therein, an electrode structure obtained therefrom, and a non-aqueous-type battery including such an electrode structure.

In recent years, remarkable development has been made in electronic technology, and various apparatus and devices have been reduced in size and weight. Accompanying the reduction in size and weight of electronic apparatus and devices, there has been a remarkably increasing demand for reduction in size and weight of a battery as a power supply for such electronic apparatus and devices. In order to generate a larger energy from a battery of small volume and weight, it is desirable to generate a higher voltage from one battery. From this viewpoint, much attention has been called to a battery using a non-aqueous electrolytic solution in combination with a negative electrode substance comprising, e.g., lithium or a carbonaceous material capable of being doped with lithium ions, and a positive electrode active substance comprising, e.g., a lithium-cobalt oxide.

However, in such a non-aqueous-type battery, the non-aqueous electrolytic solution shows only a low ionic conductivity on the order of $10^{-2}$–$10^{-4}$ S/cm compared with an ordinary level ionic conductivity of ca. $10^{-1}$ S/cm in an aqueous electrolytic solution, so that it becomes essential to use an electrode (layer) in a small thickness of several pm to several hundred $\mu$m and in a large area. As a method of economically obtaining such a thin and large-area electrode, it has been known to disperse a powdery electrode material comprising an electrode active substance in a binder solution obtained by dissolving an organic polymer functioning as a binder for the powdery electrode material to form an electrode-forming composition and applying the composition onto an electroconductive substrate, such as a metal foil or a metal net, followed by drying to form an electrode. As such a binder solution for a non-aqueous-type battery, those obtained by dissolving various grades of vinylidene fluoride polymers in polar solvents, such as N-methyl-2-pyrrolidone, dimethylformamide, N,N-dimethylacetamide have been known as disclosed in Japanese Laid-Open Patent Application (JP-A) 6-93025 and JP-A 6-172452.This is because a vinylidene fluoride polymer is excellent in chemical resistance, weatherability, anti-staining property, etc., is soluble in a polar solvent as described above but is stable against a non-aqueous electrolytic solution while it is swollen to some extent within such a non-aqueous electrolytic solution. Further, a vinylidene fluoride polymer can retain a good adhesion onto a substrate of metal, etc., by copolymerization or modification.

There has been found a problematic phenomenon that a binder solution obtained by dissolving such a vinylidene fluoride polymer in a polar solvent exhibits a remarkably increased solution viscosity depending on a production lot of the solvent used. Such an increased solution viscosity makes it difficult to obtain a uniform thickness of film in the electrode formation step by application and causes gelling at the time of kneading with the active substance so that the film formation per se becomes difficult. Even if the film formation is possible, there has been observed a phenomenon that the binder film after the applying and drying exhibits a large degree of swelling in a non-aqueous electrolytic solution. A large degree of swelling of the binder in a non-aqueous electrolytic solution leads to an increase in contact resistance between the powdery electrode material, particularly the active substance, and the metal foil or metal net, and an increase in contact resistance between the active substance particles themselves, thus resulting in an increased internal resistance in the battery. In the case of a secondary battery capable of repetitive charging and discharging, the increased internal resistance leads to an inferior charge-discharge cycle performance and is liable to result in a shorter battery life.

The gelling during mixing with an active substance is rather remarkably caused in the step of forming a positive electrode-forming slurry composition than in the step of forming a negative electrode-forming slurry composition using carbon as a powdery electrode material. From this fact, it is assumed that the gelling of a vinylidene fluoride polymer in the positive electrode-forming slurry composition is attributable to the function of a lithium-based complex metal oxide as a positive electrode active substance, and it has been also found that this tendency is particularly promoted in the case of adding carbon black as an electroconductivity-imparting additive.

SUMMARY OF THE INVENTION

Accordingly, a principal object of the present invention is to provide a vinylidene fluoride polymer binder solution which per se is stable without causing a viscosity increase and allows the formation of a battery electrode which is stable and free from excessive swelling in a non-aqueous electrolytic solution, and also an electrode-forming composition formed by dispersing a powdery electrode material in such a binder solution.

Another object of the present invention is to stabilize a positive electrode-forming composition in which the gelling of a vinylidene fluoride polymer is liable to be promoted.

A further object of the present invention is to provide an electrode structure formed from the above-mentioned electrode-forming composition, and a non-aqueous-type battery including such an electrode structure.

According to the present invention, there is provided a vinylidene fluoride polymer binder solution, comprising: a solution of a vinylidene fluoride polymer in an organic solvent, stabilized by addition of an acid. It is preferred that the acid has been added in such an amount as to provide the binder solution, a portion of which will provide a 10-times dilution thereof with deionized water exhibiting a pH of at most 9. The acid may preferably be an organic acid.

According to another aspect of the present invention, there is provided an electrode-forming composition comprising a powdery electrode material dispersed in a vinylidene fluoride polymer binder solution as described above.

According to the present invention, there are further provided an electrode structure, comprising: an electroconductive substrate, and a composite electrode layer disposed on at least one surface of the substrate comprising a powdery electrode material and a vinylidene fluoride polymer stabilized by an organic acid; and a non-aqueous-type battery including such an electrode structure as a positive or a negative electrode.

Some explanation is added regarding the function and effect of the present invention. As a result of our study, it has been found that the above-mentioned abnormal viscosity increase in a vinylidene fluoride polymer binder solution is associated with an acidity or alkalinity of the system. It is difficult to directly measure the acidity or alkalinity of the solution of a vinylidene fluoride polymer in an organic solvent, but a measure may be obtained by diluting a portion thereof with ten times in amount of deionized water and measure a pH of the resultant liquid. As a result of such a measurement, it has been found that the solution system having caused a viscosity increase shows a pH exceeding 9 of such a 10-times dilution liquid. Further knowledge or assumptions have been obtained, such that the viscosity increase is related with dehydrofluorination of a vinylidene fluoride polymer in an alkaline medium which per se is a known phenomenon and is directly related with the binder performance thereof; many of polar solvents exhibiting a good dissolving power for a vinylidene fluoride polymer are nitrogen-containing organic solvents, such as N-methylpyrrolidone and dimethylformamide; and whether the viscosity increases or not and how much it increases are depending on the production lot of a solvent, and are related with an increase of alkalinity of the solvent due to an alkaline substance, such as amine, which remains, or is generated or liberated during the production or the storage thereafter of such a nitrogen-containing organic solvent. Incidentally, it is assumed that the binder performance, such as a solvent resistance or anti-swelling property, of a vinylidene fluoride polymer is lowered by the dehydrofluorination because the dehydrofluorinated site is liable to be bonded with oxygen to consequently increase the affinity with a non-aqueous electrolytic solution, or the resultant increase of different kinds of bond in polymer molecular structure lowers the crystallinity of the polymer which is an effective factor for providing a good solvent resistance. The present invention is based on such analysis and also based on a knowledge that the above-mentioned difficulty of a vinylidene fluoride polymer binder solution accompanied with a viscosity increase can be effectively suppressed by the addition of an acid for providing a pH of the system at 9 or less.

Further, it has been also confirmed that the above-mentioned stabilization effect of acid addition is also remarkably observed in a positive electrode-forming slurry composition, and the use of an organic acid is particularly preferable.

These and other objects, features and advantages of the present invention will become more apparent upon a consideration of the following description of the preferred embodiments of the present invention taken in conjunction with the accompanying drawings.

BRIEF DESCRIPTION OF THE DRAWING

FIG. 1 is a partial sectional view of an electrode structure which may be adopted in a non-aqueous-type battery.

FIG. 2 is a partially exploded perspective view of a non-aqueous-type secondary battery which can be constituted according to the present invention.

DETAILED DESCRIPTION OF THE INVENTION

The vinylidene fluoride polymer used in the present invention may include vinylidene fluoride homopolymer, vinylidene fluoride copolymer and modification products of these. Vinylidene fluoride homopolymer is preferred in view of resistance to a non-aqueous electrolytic solution, particularly anti-swelling property. However, the homopolymer is liable to exhibit a somewhat low adhesion onto an electrode substrate, e.g., metal, so that it is preferred to use a copolymer of vinylidene fluoride with another monomer, particularly an unsaturated dibasic acid monoester, a vinylene carbonate, an epoxy group-containing vinyl monomer, etc., to obtain a copolymer having a polar group, such as a carboxyl group, a carbonate group or an epoxy group (e.g., JP-A 6-172452). It is also preferred to use a modified vinylidene fluoride polymer obtained by treating such a vinylidene fluoride homopolymer or copolymer in a solvent capable of dissolving or swelling such a vinylidene fluoride polymer with a silane coupling agent or titanate coupling agent having a group reactive with the vinylidene fluoride polymer, such as an amino group or a mercapto group, and a hydrolyzable group in combination (as disclosed in JP-A 6-93025). In order to retain a good anti-swelling resistance against a non-aqueous electrolytic solution as a whole, however, the vinylidene fluoride polymer may preferably retain at least 90 mol. %, particularly at least 95 mol. %, of untreated vinylidene fluoride units.

The vinylidene fluoride polymer may preferably have an inherent viscosity (logarithmic viscosity number at 30° C. of a solution obtained by dissolving 4 g of resin in 1 liter of N,N-dimethylformamide) of 0.5 or higher, more preferably 0.5–2.0, particularly preferably 0.8–1.5.

The organic solvent used for dissolving the vinylidene fluoride polymer to provide the binder solution according to the present invention may preferably be a polar one, examples of which may include: N-methyl-2-pyrrolidone, dimethylformamide, N,N-dimethylacetamide, N,N-dimethylsulfoxide, hexamethylphosphamide, dioxane, tetrahydrofuran, tetramethylurea, triethyl phosphate, and trimethyl phosphate. These organic solvents may be used singly or in mixture of two or more species. As described above, many of good solvents for vinylidene fluoride polymer are nitrogen-containing solvents, which are also liable to generate an alkaline substance causing a viscosity increase of the binder solution. It is preferred to use a nitrogen-containing organic solvent in the present invention. However, even for a non-nitrogen-containing organic solvent, it is preferred to add an acid for pH control according to the present invention because it becomes possible to obviate a difficulty accompanying a pH increase possibly caused for some reason thereafter. Examples of such non-nitrogen-containing good solvents include dioxane, tetrahydrofuran and trialkyl phosphates, which can suitably be used singly or in mixture with a nitrogen-containing organic solvent.

For obtaining the binder solution according to the present invention, it is preferred to dissolve 0.1–20 wt. parts, particularly 1–15 wt. parts, of the above-mentioned vinylidene fluoride polymer in 100 wt. parts of such an organic solvent. Below 0.1 wt. part, the polymer occupies too small a proportion in the solvent, thus being liable to fail in exhibiting a sufficient binder performance. Above 20 wt. parts, the resultant solution is liable to have an excessively high viscosity, thus making it difficult to prepare an electrode-forming composition.

It is preferred to add an acid to the binder solution so that a portion of the binder solution after the acid addition is diluted with 10-times in amount of deionized water to provide a liquid which exhibits a pH of at most 9.

The acid to be added is not basically restricted in species. It is however preferred to use such an acid that is removed by decomposition or vaporization during the steps of applying and drying the resultant electrode-forming composition to be free from remaining in the shaped electrode. It is also preferred to use an acid little reactive with an electrode active substance. In this respect, an inorganic acid, such as hydrochloric acid or sulfuric acid, is liable to react with an electrode active substance, thus being not necessarily preferred. Particularly, in the case of using an electrode active substance, such as graphite, liable to form an intercalation compound with an inorganic substance, it is preferred to use an organic acid having a large molecular diameter and thus being less liable to form an intercalation compound. It is preferred to use an organic acid which has a high vapor pressure, or is susceptible of decomposition to be scattered in a temperature region of the drying step (ordinarily at or below 175° C. which is the melting point of PVDF (vinylidene fluoride homopolymer)). Examples of the organic solvent preferred from such viewpoints may include: acrylic acid, formic acid, citric acid, acetic acid, oxalic acid, lactic acid, pyruvic acid, malonic acid, succinic acid, propionic acid, maleic acid, maleic anhydride, citraconic acid, and lactic acid. Among these, it is particularly preferred to use malonic acid, or a dibasic acid forming or capable of taking a cis-form, such as maleic acid or citraconic acid.

The incorporation of such an acid in a vinylidene fluoride polymer solution may preferably be performed by adding the acid to an organic solvent in advance for solvent pH adjustment and then dissolving the polymer in the solvent. It is however also possible to simultaneously add an acid at the time of dissolving the polymer in an organic solvent or to first dissolve the polymer in an organic solvent and then add an acid to the polymer solution.

The acid may preferably be added in an amount sufficient to provide a binder solution, a portion of which will provide a 10-times dilution thereof with deionized water exhibiting a pH of at most 9.0, (the pH being substantially equal to that of a 10-times dilution of an organic solvent to which an acid has been added in advance according to the preferred embodiment). The lower limit of the pH is not particularly restricted but may ordinarily be down to ca. 3 as a particular improvement cannot be expected by the addition of a further amount of acid. However, in the case of using an organic acid according to a preferred embodiment, the organic acid is decomposed or evaporated during the applying and drying steps for electrode formation, so that an excessive addition thereof is not harmful. Even in case where the organic solvent or the binder solution before the acid addition already exhibits the dilution pH of 9 or below, it is preferred to add a certain amount of the acid so as to exhibit a buffer effect of resisting a possible pH increase thereafter for some reason, such as decomposition of the solvent. In this instance, the acid may preferably be added in an amount of at least 100 wt. ppm, more preferably 300–10,000 wt. ppm, in the resultant binder solution. In this mode, it is particularly preferred to use an organic acid which results in almost no harm even if it remains thereafter. Such an organic acid even exhibits a tendency of improving the electrode performances through stabilization of the vinylidene fluoride polymer by remaining thereof in the electrode.

An electrode-forming composition may be obtained by adding and dispersing a powdery electrode material (an active substance and optional additives, such as an electroconductivity-imparting additive) into the thus-obtained vinylidene fluoride polymer binder solution according to the present invention.

In the case of forming a positive electrode, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCO_{1-x}O_2$, and spinel-structured $LiMn_2O_4$. Among these, it is particularly preferred to use a Li—Co or Li—Ni binary composite metal oxide or Li—Ni—Co ternary composite metal oxide inclusively represented by a formula of $LiNi_xCo_{1-x}O_2$ ($0 \leq x \leq 1$) in view of a high charge-discharge potential and excellent cycle characteristic.

In the case of forming a negative electrode, the active substance may preferably comprise a carbonaceous material, such as graphite, activated carbon or a carbonaceous material obtained by carbonization of phenolic resin, pitch, etc.

An electroconductivity-imparting additive may be added in order to improve the conductivity of a resultant composite electrode layer formed by applying and drying of the electrode-forming composition of the present invention, particularly in case of using an active substance, such as $LiCoO_2$, showing a small electron-conductivity in a positive electrode. Examples thereof may include: carbonaceous materials, such as carbon black, graphite fine powder and fiber, and fine powder and fiber of metals, such as nickel and aluminum. The effect of stabilizing the positive electrode-forming composition according to the present invention is particularly pronounced in the case of using electroconductive carbon black (preferably one having an average particle size (diameter) of ca. 10–100 nm as measured by observation through an electron microscope) which has a large electroconductivity-improving effect but also is liable to exhibit a remarkable effect of promoting gelation of vinylidene fluoride polymer, singly or in combination with another electroconductivity-imparting additive. Such an electroconductivity-imparting additive may preferably be used in an amount of 0.1–10 wt. parts per 100 wt. parts of a composite metal oxide constituting the positive electrode. In the case of using a carbonaceous material exhibiting a large electroconductivity, such an electro-conductivity-imparting additive need not be added.

In formulating the electrode-forming composition according to the present invention, it is preferred to blend 0.1–50 wt. parts, particularly 1–20 wt. parts of vinylidene fluoride polymer with 100 wt. parts of a powdery electrode material.

The incorporation of an organic acid for stabilizing vinylidene fluoride polymer in the positive electrode-forming composition may be performed in any arbitrary manner. For example, it is possible to blend the acid simultaneously with blending of a positive electrode active substance, carbon black, a vinylidene fluoride polymer and an organic solvent. It is however preferred to form a vinylidene fluoride polymer solution containing an organic acid added thereto (more preferably by dissolving a vinylidene fluoride polymer in an organic solvent already containing an organic acid) and then blending the vinylidene fluoride polymer solution with a powdery electrode material, such as a positive electrode active substance.

The thus-prepared positive or negative electrode-forming slurry composition may be used for forming an electrode structure having a partial sectional structure as shown in FIG. 1. More specifically, referring to FIG. 1, the slurry composition may be applied onto at least one surface, preferably both surfaces, of an electroconductive substrate 11 comprising a foil or wire net of a metal, such as iron, stainless steel, steel, copper, aluminum, nickel or titanium and having a thickness of, e.g., 5–100 μm, or 5–20 μm for a small-sized battery, and dried at, e.g., 50–170° C., to form a composite electrode layer (12a, 12b) of, e.g., 10–1000 μm, preferably 10–200 μm, in thickness for a small-sized battery, thereby providing an electrode structure 10 for a non-aqueous-type battery.

FIG. 2 is a partially exploded perspective view of a lithium secondary battery as an embodiment of a non-aqueous-type battery according to the present invention, including an electrode structure prepared in the above-described manner.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element. The positive electrode 1 and the negative electrode 2 may have a structure of the electrode structure 10 shown in FIG. 1.

The non-aqueous electrolyte solution impregnating the separator 3 may comprise a solution of an electrolyte, such as a lithium salt, in a non-aqueous solvent (organic solvent).

Examples of the electrolyte may include: $LiPF_6$, $LiAsF_6$, $LiClO_4$, $LiBF_4$, $CH_3SO_3Li$, $CF_3SO_3Li$, $LiN(SO_2CF_3)_2$, $LiC(SO_2CF_3)_3$, LiCl, and LiBr. Examples of the organic solvent for such an electrolyte may include: propylene carbonate, ethylene carbonate, 1,2-dimethoxyethane, 1,2-diethoxyethane, dimethyl carbonate, diethyl carbonate, methyl ethyl carbonate, γ-butyrolactone, methyl propionate, ethyl propionate, and mixtures of these, but they are not exhaustive.

In the above, a cylindrical battery has been described as an embodiment of the non-aqueous-type battery according to the present invention. However, the non-aqueous-type battery according to the present invention can basically have any other shapes, such as those of a coin, a rectangular parallelepiped, or a paper or sheet.

EXAMPLES

Hereinbelow, the present invention will be described more specifically based Examples and Comparative Examples.
(Preparation of vinylidene fluoride polymer)

A carboxyl group-containing vinylidene fluoride polymer was prepared in the following manner.

Into a 2 liter-autoclave, 1040 g of deionized water, 0.8 g of methyl cellulose, 2.5 g of ethyl acetate, 4 g of diisopropyl peroxydicarbonate, 396 g of vinylidene fluoride and 4 g of monomethyl maleate (i.e., vinylidene fluoride/monomethyl maleate=100/1.01 (by weight)) were added and subjected to suspension polymerization at 28° C. for 47 hours. After completion of the polymerization, the polymerization slurry was de-watered, washed with water and dried at 80° C. for 20 hours to obtain a powdery polymer.

The polymerization yield was 90 wt. %, and the resultant polymer showed an inherent viscosity of 1.1, and a carbonyl group content of $1.2 \times 10^{-4}$ mol/g.
(Organic solvent)

20 lots of commercially available N-methyl-2-pyrrolidone (hereinafter abbreviated as "NMP") were stored at room temperature for ca. 3 months and then used for the following tests. The NMP in 20 lots provided 10-times dilutions with de-ionized water showing pH ranging from 6.5 to 11.0.
Comparative Example 1

Into a lot of NMP having provided a 10-times dilution with de-ionized water showing a pH of 9.5, the above-prepared carboxyl group-containing vinylidene fluoride polymer was dissolved at 50° C. so as to provide a concentration of 13 wt. % to obtain a binder solution.

Example 1

1000 ppm of maleic acid was added to the same lot of NMP as used in Comparative Example 1, and the solution was also diluted with ten times of deionized water, whereby the dilution showed a pH of 3.2. Then, into the NMP containing maleic acid, the above-mentioned vinylidene fluoride polymer was dissolved similarly as in Comparative Example 1 to prepare a binder solution at a concentration of 13 wt. %.
(Viscosity and Fluorine ion concentration measurement)

The binder solutions prepared in Comparative Example 1 and Example 1 were subjected to measurement of viscosity by using a rotating viscometer (according. to JIS K7117) and measurement of fluorine ion ($F^-$) concentration.
(Film formation and Swelling test)

Each of the binder solutions prepared in Comparative Example 1 and Example 1 was cast onto a glass plate and dried at 130° C. for 2 hours, followed by peeling, to form a ca. 200 μm-thick film.

Then, each film thus obtained was dipped at 70° C. for 72 hours in an electrolytic solution formed by dissolving 8.8 wt. parts of $LiClO_4$ into a liquid mixture of 53.6 wt. parts of propylene carbonate and 37.6 wt. parts of dimethoxyethane. In the meantime, each film was taken out at 24 hours each to evaluate the degree of swelling in terms of a cast film weight increase percentage (increased weight/weight of the film before dipping×100).

The results of the above measurement are summarized in the following Table 1.

TABLE 1

|  | Comparative Example 1 | Example 1 |
|---|---|---|
| Binder solution |  |  |
| Amount of maleic acid added | 0 | 1000 ppm |
| 10-times dilution pH | 9.5 | 3.2 |
| Viscosity (mPa.s) | 1010 | 870 |
| Fluorine ($F^-$) concentration | 200–500 ppm | <100 ppm |
| Degree of film swelling (wt. %) |  |  |
| 24 hours | 28 | 20 |
| 48 hours | 29 | 21 |
| 72 hours | 29 | 22 |

The results in the above Table 1 show that, compared with the vinylidene fluoride polymer binder solution of Comparative Example 1 using NMP as it was, the vinylidene fluoride polymer binder solution of Example 1 obtained by adding 1000 ppm of maleic acid was stabler in view of low viscosity increase and low fluorine ion concentration and showed a remarkably improved swelling resistance against an electrolytic solution for non-aqueous-type battery.

Comparative Example 2

Into a lot of NMP showing a 10-times dilution pH of 10.9, the above-mentioned carboxyl group-containing vinylidene fluoride polymer was dissolved to form a binder solution at a concentration of 13 wt. %.

Example 2

1000 ppm of malonic acid was added to the same lot of NMP as used in Comparative Example 2, and then the carboxyl group-containing vinylidene fluoride polymer was dissolved to form a binder solution at a concentration of 13 wt. %.

The binder solutions of the above Comparative Example 2 and Example 2 were respectively used for formation of a cast film similarly as in Example 1, and the resultant films were subjected to dipping in the electrolytic solution at 70° C. for 72 hours similarly as in Example 1. As a result, the films exhibited swelling degrees after 72 hours as shown below.

TABLE 2

|  | Comparative Example 2 | Example 2 |
| --- | --- | --- |
| Amount of malonic acid | 0 | 1000 ppm |
| Swelling degree after 72 hrs. | 25 wt. % | 18 wt. % |

Comparative Example 3

Into a lot of NMP showing a 10-times dilution of pH of 9.5, vinylidene fluoride homopolymer ("KF Polymer #1100", available from Kureha Kagaku Kogyo K.K.) was dissolved at 50° C. to form a binder solution at a concentration of 13 wt. %.

Example 3

1000 ppm of maleic acid was added to the same lot of NMP as used in Comparative Example 3, and then the vinylidene fluoride homopolymer used in Comparative Example 3 was dissolved therein to form a binder solution at a concentration of 13 wt. %.

The thus-formed binder solutions were subjected to measurement of viscosity and degree of film swelling similarly as in Example 1. The results are shown in Table 3 below.

TABLE 3

|  | Comparative Example 1 | Example 1 |
| --- | --- | --- |
| Binder solution |  |  |
| Amount of maleic acid added | 0 | 1000 ppm |
| 10-times dilution pH | 9.5 | 3.2 |
| Viscosity (mPa.s) | 980 | 717 |
| Degree of film swelling (wt. %) |  |  |
| 72 hours | 20 | 15 |

Also in this case, the addition of maleic acid provided a binder solution showing a good viscosity increase-preventing effect and an improved film swelling resistance.

Example 4 and Comparative Example 4

The films prepared in the above Example 1 and Comparative Example 1 were respectively dipped in an electrolytic solution comprising 11.6 wt. % of $LiPF_6$, 510 wt. % of ethylene carbonate and 37.4 wt. % of diethyl carbonate at 70° C. for 72 hours. After the dipping, the films showed swelling degrees (weight increases due to swelling) of 18 wt. % and 24 wt. %, respectively.

Example 5

9 wt. parts of $LiNi_{0.8}Co_{0.2}O_2$ (active substance, Dav. (average particle diameter)=15 $\mu$m), 0.7 wt. part of electroconductive carbon black (Dav.=ca. 40 nm, specific surface area=30 $m^2$/g, oil absorption=129 ml/g), 0.3 wt. part of vinylidene fluoride homopolymer ("KF Polymer #1300", available from Kureha Kagaku Kogyo K.K.), and 6 wt. parts of NMP containing 0.1 wt. % of maleic acid were blended with each other and uniformly dispersed at 50° C. to prepare a positive electrode-forming slurry composition. The slurry showed substantially identical viscosities before and after storage for 24 hours at room temperature. The slurry was applied onto one surface of a 10 $\mu$m-thick copper foil and dried at 130° C. to form a totally 100 $\mu$m-thick electrode structure having a smooth positive electrode layer.

Example 6

9 wt. parts of $LiNi_{0.9}Co_{0.1}O_2$ (Dav.=15 $\mu$m), 0.7 wt. part of electroconductive carbon black, 0.3 wt. part of vinylidene fluoride homopolymer ("KF Polymer #1300") and 6 wt. parts of NMP containing 0.1 wt. % of citraconic acid were blended with each other and uniformly dispersed at 50° C. to prepare a positive electrode-forming slurry composition. The slurry showed substantially identical viscosities before and after storage for 24 hours at room temperature. The slurry was applied onto one surface of a 10 $\mu$m-thick copper foil and dried at 130° C. to form a totally 105 $\mu$m-thick electrode structure having a smooth positive electrode layer.

Example 7

A positive electrode-forming slurry composition was prepared in the same manner as in Example 5 except for using 6 wt. parts of NMP containing 0.1 wt. % of malonic acid instead of the 0.1 wt. % of maleic acid. The slurry showed substantially identical viscosities before and after storage for 24 hours at room temperature. The slurry was applied onto one surface of a 10 $\mu$m-thick copper foil and dried at 130° C. to form a totally 102 $\mu$m-thick electrode structure having a smooth positive electrode layer.

Example 8

A positive electrode-forming slurry composition was prepared in the same manner as in Example 5 except for using 6 wt. parts of NMP containing 0.1 wt. % of acetic acid instead of the 0.1 wt. % of maleic acid. The slurry showed substantially identical viscosities before and after storage for 24 hours at room temperature. The slurry was applied onto one surface of a 10 $\mu$m-thick copper foil and dried at 130° C. to form a totally 106 $\mu$m-thick electrode structure having a smooth positive electrode layer.

Comparative Example 5

A positive electrode-forming slurry composition was prepared in the same manner as in Example 5 except for using 6 wt. parts of NMP containing no maleic acid.

After the preparation, the slurry caused severe gelling when it was stored for 2–3 hours at room temperature, thus making it difficult to apply the slurry onto a copper foil. After 24 hours of storage at room temperature, the slurry became a rather hard pudding state and could not be used.

As described above, according to the present invention, an acid, preferably an organic acid, is added during formation of a binder solution for a non-aqueous-type battery electrode by dissolving a vinylidene fluoride polymer in an organic solvent, whereby it is possible to effectively obviate a viscosity increase of the binder solution, a lowering of binder effect in the resultant electrode due to swelling of the binder with an electrolyte solution, and gelling of an electrode-forming slurry, particularly a positive electrode-forming slurry, which are problematic but have been frequently caused heretofore in non-aqueous-type battery electrode formation.

What is claimed is:

1. A vinylidene fluoride polymer binder solution, consisting essentially of a solution of a vinylidene fluoride polymer in an organic solvent, and an acid added to the solution as a stabilizer, wherein said vinylidene fluoride polymer is a copolymer of at least 95 mol. % of vinylidene fluoride with another copolymerizable monomer, and has an inherent viscosity of at least 0.5 as measured at 30° C. at a concentration of 4 g/liter in N,N-dimethylformamide.

2. A vinylidene fluoride polymer binder solution, consisting essentially of a solution of a vinylidene fluoride polymer in an organic solvent, and an acid added to the solution as a stabilizer, wherein said vinylidene fluoride polymer is a carboxyl group-containing vinylidene fluoride homopolymer or copolymer, and has an inherent viscosity of at least 0.5 as measured at 30° C. at a concentration of 4 g/liter in N,N-dimethylformamide.

3. A vinylidene fluoride polymer binder solution, consisting essentially of a solution of a vinylidene fluoride polymer in an organic solvent, and an acid added to the solution as a stabilizer, which binder solution has been prepared by first adding the acid to the organic solvent and then dissolving the vinylidene fluoride polymer in the organic solvent, wherein said vinylidene fluoride polymer has an inherent viscosity of at least 0.5 as measured at 30° C. at a concentration of 4 g/liter in N,N-dimethylformamide.

4. A vinylidene fluoride polymer binder solution, comprising a solution of a vinylidene fluoride polymer in an organic solvent, and an acid added to the solution as a stabilizer, which binder solution has been prepared by first adding the acid to the organic solvent and then dissolving the vinylidene fluoride polymer in the organic solvent, wherein said vinylidene fluoride polymer has an inherent viscosity of at least 0.5 as measured at 30° C. at a concentration of 4 g/liter in N,N-dimethylformamide.

5. A binder solution according to claim 1, 2, 3 or 4, wherein a 10-times dilution of the binder solution with deionized water exhibits a pH of at most 9.

6. A binder solution according to claim 1, 2, 3 or 4, wherein the acid is an organic acid.

7. A binder solution according to claim 1, 2, 3 or 4, wherein said organic solvent is a nitrogen-containing organic solvent.

8. An electrode-forming composition, comprising a powdery electrode material dispersed in a vinylidene fluoride polymer binder solution according to claim 4.

9. An electrode structure, comprising: an electroconductive substrate, and a composite electrode layer disposed on at least one surface of the substrate comprising a powdery electrode material and a vinylidene fluoride polymer and formed by applying onto the electroconductive substrate and drying an electrode-forming composition according to claim 8.

* * * * *